United States Patent [19]

Greenwalt

[11] Patent Number: 5,413,622

[45] Date of Patent: May 9, 1995

[54] METHOD OF MAKING HOT METALS WITH TOTALLY RECYCLED GAS

[75] Inventor: Richard B. Greenwalt, Danville, Calif.

[73] Assignee: Bechtel Group, Inc., San Francisco, Calif.

[21] Appl. No.: 168,699

[22] Filed: Dec. 16, 1993

[51] Int. Cl.⁶ .............................................. C21B 13/14
[52] U.S. Cl. ...................................................... 75/446
[58] Field of Search ......................................... 75/446

[56] References Cited

U.S. PATENT DOCUMENTS 5,043,011  8/1991  Hauk ...................................... 75/446
5,185,032  2/1993  Whipp .................................... 75/436

OTHER PUBLICATIONS

Fleichtner, Hanns et al., "The Corex Process" *Skillings' Mining Review* Jan. 14, 1989 pp. 20–27.

*Primary Examiner*—Melvyn J. Andrews
*Attorney, Agent, or Firm*—Townsend and Townsend Khourie and Crew

[57] ABSTRACT

A method is provided to improve the production of hot direct reduced iron in a melter-gasifier; reduction furnace system. All of the reduction gas produced in the melter gasifier and the top gas produced in reduction furnace which has been stripped of $CO_2$ are recycled to the reduction furnace. The reduction furnace is sized to process all this gas and bypassed direct reduced iron may result.

8 Claims, 3 Drawing Sheets

METHOD OF MAKING HOT METALS WITH TOTALLY RECYCLED GAS

BACKGROUND OF THE INVENTION

The invention relates to a method of making iron in a melter-gasifier-reduction furnace system wherein the reduction gas and the stripped top gas produced in the system are recycled. Specifically the invention relates to an improvement to an iron making process using a reduction furnace and a melter gasifier for making hot metal, in which the top gas produced in the reduction furnace during the reduction of iron ore is stripped of $CO_2$ and is preheated and combined with reduction gas from the melter gasifier and the combined gas is injected into the reduction furnace for reduction of iron ore.

In recent years methods utilizing a melter gasifier have been developed to produce molten iron or steel preproducts and reduction gas. Most of these processes utilize a coal fluidized-bed. A high temperature is produced in the melter gasifier utilizing coal and blown in oxygen to produce a fluidized bed and iron sponge particles are added from above to react in the bed to produce the molten iron.

A melter gasifier is an advantageous method for producing molten iron or steel preproducts and reduction gas as described in U.S. Pat. No. 4,588,437. Thus there is disclosed a method and a melter gasifier for producing molten iron or steel preproducts and reduction gas. A first fluidized-bed zone is formed by coke particles, with a heavy motion of the particles, above a first blow-in plane by the addition of coal and by blowing in oxygen-containing gas. Iron sponge particles and/or pre-reduced iron ore particles with a substantial portion of particle sizes of more than 3 mm are added to the first fluidized-bed zone from above. A melter gasifier for carrying out the method is formed by a refractorily lined vessel having openings for the addition of coal and ferrous material, openings for the emergence of the reduction gases produced, and openings for tapping the metal melt and the slag. Pipes or nozzles for injection of gases including oxygen enter into the melter gasifier above the slag level at least two different heights.

Another process utilizing a melter gasifier is described in U.S. Pat. No. 4,725,308. Thus there is disclosed a process for the production of molten iron or of steel preproducts from particulate ferrous material as well as for the production of reduction gas in the melter gasifier. A fluidized-bed zone is formed by coke particles upon the addition of coal and by blowing in oxygen-containing gas by nozzle pipes penetrating the wall of the melter gasifier. The ferrous material to be reduced is introduced into the fluidized bed. In order to be able to produce molten iron and liquid steel preproducts in a direct reduction process with a lower sulfur content of the coal used, the ferrous material to be reduced is supplied closely above the blow-in gas nozzle plane producing the fluidized bed. An arrangement for carrying out the process includes a melter gasifier in which charging pipes penetrating its wall are provided in the region of the fluidized-bed zone closely above the plane formed by the nozzle pipes. The ferrous material to be melted as well as the dusts separated from the reduction gas and, if desired, fluxes containing calcium oxide, magnesium oxide, calcium carbonate and/or magnesium carbonate are introduced therethrough.

U.S. Pat. No. 4,739,855 to Rolf Hauk discloses a process for the gasification of sewage sludge or other carbon-containing waste materials in a gasifier. A solid fuel and oxygen-containing gas are also fed into the gasifier. The solid fuel may be coal or petroleum coke. The residues formed during gasification collect at the bottom of the gasifier in the form of molten slag. Gasification takes place in a fluidized bed formed above the slag bath and constituted by the dried sewage sludge or waste materials, the solid fuel, the oxygen-containing gas and the gasification gas. The gas produced in the gasifier can be used for power generation or as a reducing gas for iron ore. Sponge iron can simultaneously be melted in the gasifier and reduced to pig iron.

There is also a process that utilizes a combined reduction furnace and melter gasifier known as the COREX® process (COREX® is a trademark of Deutsche Voest-Alpine Industrieanlagenbau GMBH and Voest-Alpine Industrieanlagenbau). This process is described in *Skillings'Mining Review*, Jan. 14, 1989 on pages 20-27 and in detail in the Prior Art section of this specification. Broadly in the COREX® process the metallurgical work is carried out in a reduction furnace and a melter gasifier. Using non-coking coals and iron bearing materials such as lump ore, pellets or sinter, hot metal is produced with blast furnace quality. Passing through a pressure lock system, coal enters the dome of the melter gasifier where destructive distillation of the coal takes place at temperatures in the range of 1,100°-1,150° C. Oxygen blown into the melter gasifier produces a coke bed from the introduced coal and results in a reduction gas consisting of 95% CO +$H_2$ and approximately 2% $CO_2$. This gas exits the melter gasifier and is dedusted and cooled from about 1100° C. or so to the desired reduction temperature between 800° and 850° C. The gas is then used to reduce lump ores, pellets or sinter in the reduction furnace to sponge iron having an average degree of metalization above 90%. The sponge iron is extracted from the reduction furnace using a specially designed screw conveyor and drops into the melter gasifier where it melts to the hot metal. As in the blast furnace, limestone adjusts the basicity of the slag to ensure sulfur removal from the hot metal. Depending on the iron ores used, $SiO_2$ may also be charged into the system to adjust the chemical composition and viscosity of the slag. Tapping procedure and temperature as well as the hot metal composition are otherwise exactly the same as in a blast furnace. The top gas of the reduction furnace has a net calorific value of about 7,000-8,000 KJ/$Nm^3$ and can be used for a wide variety of purposes.

The fuels used in these processes are typically described as a wide variety of coals and are not limited to a small range of coking coal. The above-noted article from *Skillings'Mining Review* notes that petroleum coke suits the requirements of the COREX® process. Brown coal and steam coal which are relatively poor quality coal having a relatively high ash content i.e. plus 15%, have been identified as suitable for use in these processes. Coke made from coal has also been identified as a fuel for many of the processes utilizing melter gasifiers.

The present invention is directed to an improvement in the method of making iron in a melter-gasifier-reduction furnace.

RELATED APPLICATIONS

This application is related to application Ser. No. 07/958,043 filed Oct. 6, 1992, now U.S. Pat. No. 5,259,864; Ser. No. 07/991,914, filed Dec. 17, 1992, Ser. No. 08/056,341, filed Apr. 30, 1993 and Ser. No. 8/084,888 filed Jun. 30, 1993. The disclosures the these applications are incorporated herein for all purposes.

DESCRIPTION OF PRIOR ART TO WHICH THIS INVENTION RELATES

Figure 1:
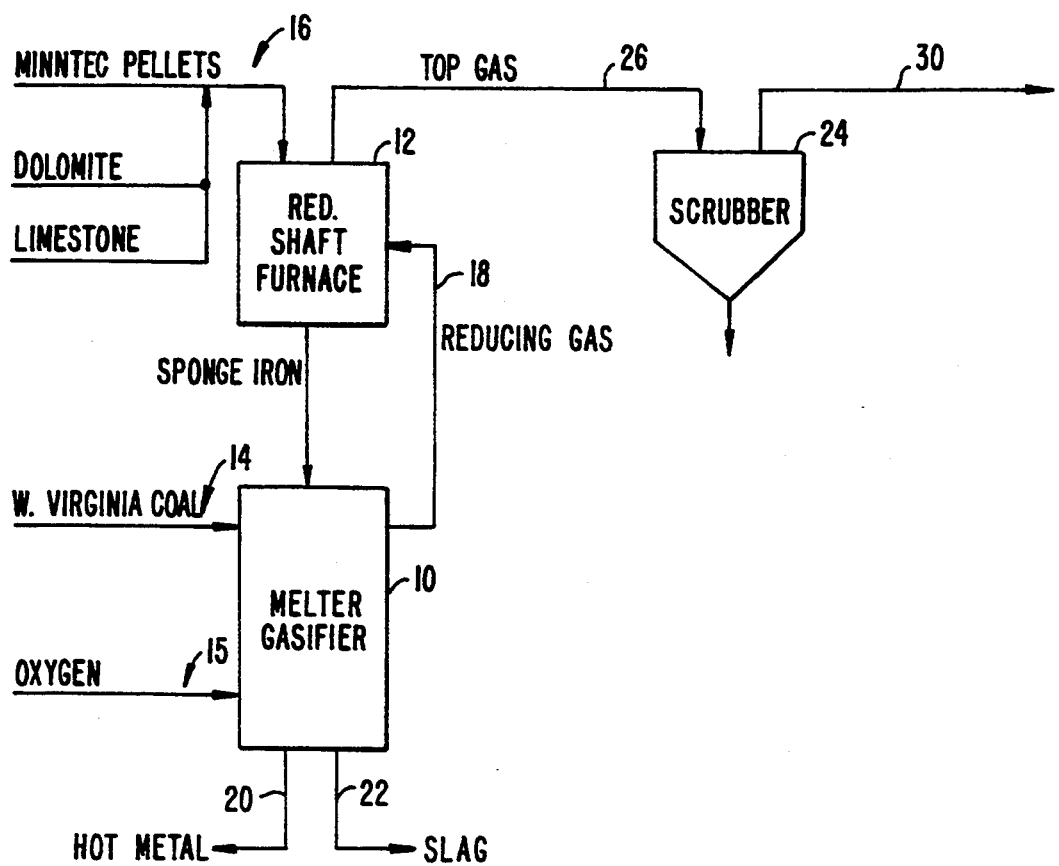
FIG. 1 is a flow diagram illustrating prior art.
Figure 2:
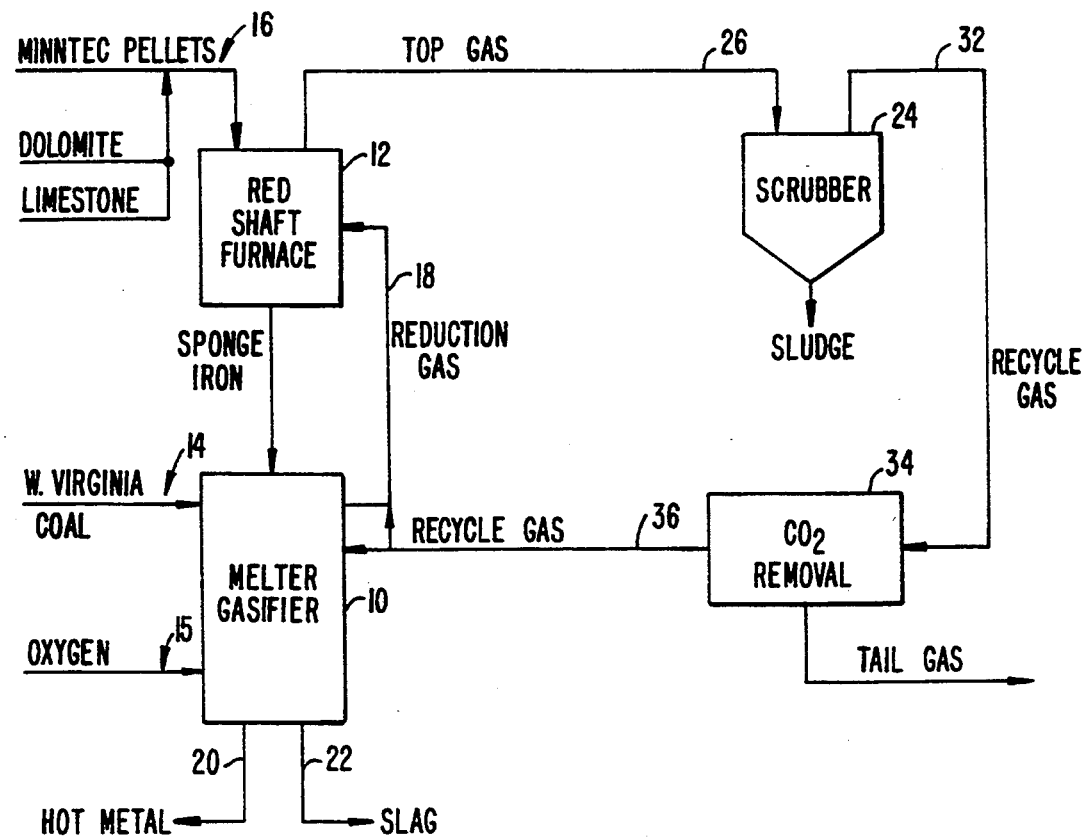
FIG. 2 is a flow diagram illustrating prior art.

FIGS. 1 and 2 are process diagrams of a system for making iron ore using a reduction furnace and a melter gasifier and specifically shows the COREX ® process as heretofore practiced. The prior art systems are described in detail in THE COREX PROCESS, *Skillings' Mining Review*, Jan. 14, 1989, Pages 20-27. FIGS. 1 and 2 show a COREX ®-PROCESS DIAGRAM WITH EXPORT GAS and COREX ® AND A PROCESS DIAGRAM WITHOUT EXPORT GAS, respectively.

Referring to FIG. 1, a melter gasifier 10 and a reduction shaft furnace 12 are operably connected together. Reduction of the iron ore occurs in the reduction furnace 12 and generation of reducing gas and melting occurs in the melter gasifier 10. Charging of coal and iron ore to the melter gasifier 10 and the reduction furnace 12 is done by conventional lock hopper systems indicated by numerals 14 and 16 and oxygen is supplied to the melter gasifier at 15. The fuel, such as coal comes into a reducing gas atmosphere at a temperature of 1000° to 1100° in the melter gasifier and the carbon in the coal is oxidized to $CO_2$ and then reacts with free carbon to form CO. A reducing gas is thus formed in the melter gasifier comprising carbon monoxide, hydrogen, carbon dioxide, methane, nitrogen and steam.

The reducing gas is flowed from the melter gasifier 10 via conduct 18 and fed into the reduction furnace 12. Various cooling and cleaning steps, not shown in FIG. 1, may be done to the gas between the melter gasifier and the reduction furnace. The reducing gas flows countercurrent to the iron ore charged into the top of the reduction furnace 12 to form direct reduced iron. The direct reduced iron is charged continuously to the melter gasifier where it is heated and melted forming hot metal and slag which are discharged at 20, 22 by conventional means.

The reaction in the reduction furnace is exothermic during which a top gas is formed. The top gas is removed from the reduction furnace and flows to a scrubber 24 via conduit 26. The top gas is cleaned and cooled and is available for various purposes. FIG. 1 shows the iron making process where the export gas is removed via conduit from the system. According to the Skillings'article, the export gas is a valuable source of energy for oxygen generation, for drying of coal, as heating gas in pelletizing facilities, foundries, steel mills or other industries with thermal treatment, for the generation of electrical energy, and as synthesis gas in chemical industry (production of methanol, ammonia, urea, acetic acid and other chemical products).

Refer now to FIG. 2, where the prior art system for producing hot metal without export gas is shown. A melter gasifier and a reduction furnace are also used. This prior art process is described in the Skillings'article at page 22 and, referring to FIG. 4 of the article, states that in case the export gas cannot economically be utilized, the top gas is reconverted into reducing gas by $CO_2$ removal. One part of the reducing gas from the $CO_2$ removal serves for cooling the generator gas, the greater part being reheated in the melter gasifier. The advantage claimed for this operational mode is the fact that the coal consumption is expected to be reduced to less than 500 kg/t of hot metal and the oxygen consumption to less than 300 $Nm^3$/t of hot metal. For the example with export gas production, coal consumption is expected to be 800 kg/t of hot metal; for the example without export gas, production is expected to be 470 kg/t of hot metal only. Thus it is evident that much less hot metal is produced in the system without export gas.

The system shown in FIG. 2 is similar to the system of FIG. 1. The differences are in how the gasses formed in the processes are handled. Basically, as shown in FIG. 2, the top gas is cleaned in the scrubber 24 and instead of being exported, it is recycled via conduit 32 to a $CO_2$ removal vessel 34. The greater part, 90% or more, of the recycle gas is directed to the melter gasifier via conduit 36 for reheating while a smaller part, 10% or less, is used for cooling the generator gas. Fundamentally, in the prior art process where gas was recycled rather than exported the amount of gas produced was reduced so that it could be accommodated in the closed system. This resulted in less coal (fuel) being consumed but also in much less iron being produced. Thus, according to the Skillings article, as noted above, less coal is used however much less iron is produced.

SUMMARY OF THE INVENTION

The present invention provides a method of making molten iron utilizing a direct reduction furnace and a melter gasifier which includes recycling the top gas produced by the reduction furnace after $CO_2$ is removed therefrom to form a recycle gas which is injected back into the direct reduction furnace. The reduction gas produced by the melter gasifier is also supplied to the direct reduction furnace. In the present system a direct reduction furnace is operably coupled to a melter gasifier having sufficient capacity to utilize all of the reduction gas produced by the melter gasifier and the recycle gas formed from the top gas produced by the direct reduction furnace. Carbonaceous fuel is introduced into the melter gasifier and oxygen containing gas is blown into the melter gasifier to combust the carbonaceous fuel to format least a first fluidized bed of coke particles from the carbonaceous fuel. Iron ore is reduced in the reduction furnace to direct reduced iron. A portion of the direct reduced iron is introduced into the melter gasifier through an entry port in the upper portion thereof. Coke, oxygen and direct reduced iron are reacted in the melter gasifier to combust the major portion of the coke to produce reduction gas and molten iron containing heavy metals freed from combustion of the coke and a processed slag. Reduction gas is flowed out of the melter gasifier and combined with the recycle gas formed by $CO_2$ removal from the top gas from the reduction furnace to form a combined gas. The recycle gas is preferably reheated to at least about 500° C. and preferably to about 600° C. prior to combining it with the reduction gas. All of the combined gas is directed to the reduction furnace where it is reacted with iron ore to convert the iron ore to direct reduced iron and to carbonize the direct reduced iron with an increased carbon content prior to discharging direct reduced iron to the melter gasifier for further processing and optionally bypassing a portion of the direct reduced iron from the melter gasifier for other uses. Preferably about equal amounts of direct reduced iron are utilized in the melter gasifier and bypassed.

OBJECT OF THE INVENTION

It is a particular object of the present invention to provide an improvement in a process for making iron using a reduction furnace and a melter gasifier wherein the gasses produced in the melter gasifier and the reduction furnace are combined for direct reduction. Other objects and advantages of the present invention will be apparent from the following detailed description read in view of the accompanying drawings which are made a part of this specification.

PREFERRED EMBODIMENT OF THE INVENTION

Figure 3:
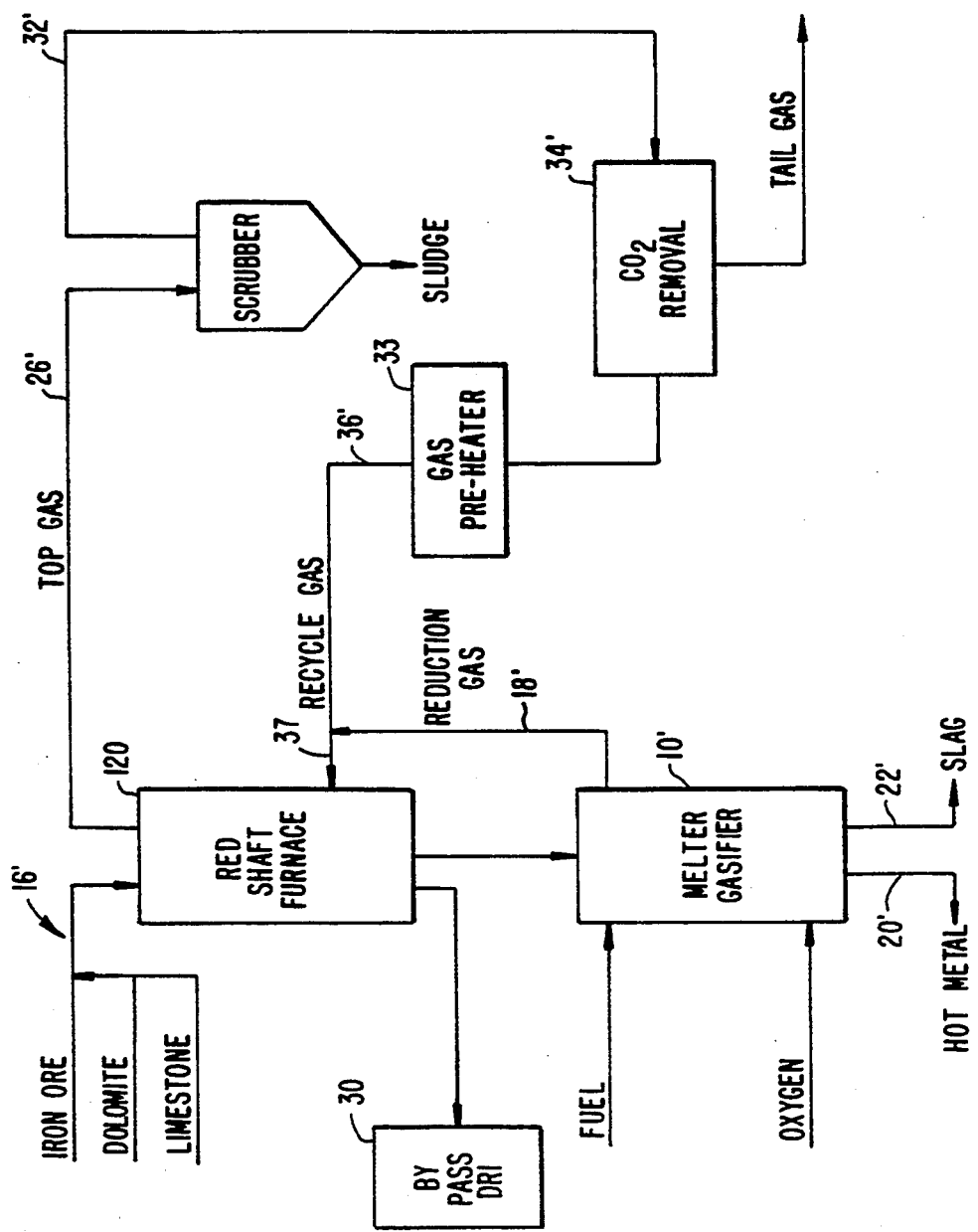
FIG. 3 is a flow diagram illustrating the preferred method of the present invention.

The system of the present invention is shown in FIG. 3. Components in the system of the present invention which are the same as components of the prior art are indicated by the same numeral with a prime ("'") added. Components that provide a similar function but differ in size for example from the prior art components are indicated by adding a "0" to the end of the prior art numeral, i.e., 12 becomes 120. New components in the present system are given new numbers.

In accordance with the present invention all the top gas produced in the reduction furnace 120 after $CO_2$ removal and preheating as well as all of the reducing gas produced in the melter gasifier 10' are utilized for direct reduced iron production. In this approach the direct reduced iron output is substantially increased and may be doubled over the prior art approach. In accordance with the invention, the direct reduction furnace 120 must be substantially increased in size to about double that of a comparable prior art reduction furnace when used with the same melter gasifier. The reduction furnace is of a size and volume to process twice the amount of iron ore and the combined recycle gas and reducing gas volume.

With a double size reduction furnace 120, the recycle gas is $CO_2$ stripped, preheated and recycled to the reduction furnace 120 along with the melter gasifier produced reduction gas. The melter gasifier 10' and reduction furnace 120 are self-contained and can thus be continuously operated to their full capacity, including overblowing, without being dependent on operation of separate export gas consumers. As only half of the double size reduction furnace 120 direct reduced iron capacity can be used in the melter gasifier 10', the other half of the direct reduced iron product can be directed hot to steelmaking, hot briquetted or cooled and exported as indicated by box 30 of FIG. 3.

The capacity of the vertical cylindrical vessel direct reduction furnace 120 is essentially doubled by doubling the furnace area at the reduction gas inlets (tuyeres) which enables twice the throughput of reducing gas and iron ore solids to descend through the reducing zone in the direct reduction furnace 120. The direct reduction furnace 120 capacity is also a function of the retention time or the volume of the reduction furnace which is increased by increasing the reduction furnace diameter and the reduction furnace height as illustrated schematically in FIG. 3 by the larger size of reduction furnace 120 compared to the prior art reduction furnace 12 which would heretofore be used in a closed system for a given size melter gasifier 10 and 10'.

The present invention provides a method of making molten iron utilizing a direct reduction furnace and a melter gasifier which includes recycling the reduction gas produced by the melter gasifier 10' and the top gas produced by the reduction furnace 120 after $CO_2$ stripping and preheating to form a recycle gas. A melter gasifier 10' is coupled to a direct reduction furnace 120 having sufficient capacity to utilize all of both the reduction gas produced by the melter gasifier and the recycle gas produced by the direct reduction furnace.

The recycle gas is produced by removing $CO_2$ at vessel 34' from the top gas produced in reduction furnace 120 after the top gas has been processed in scrubber 24'. The so produced recycle gas is flowed from $CO_2$ removal to a preheater 33 where the recycle gas is preheated to at least about 500° C. and preferably to about 600° C. prior to being combined with the reduction gas which exits the melter gasifier at about 1100° C. to 1150° C. and injected into the reduction furnace 120 via conduit 37. The temperature of the injected combined gas should be about 800° C. to 850° C. If the recycle gas is not reheated prior to being injected into the reduction furnace, the temperature in the reduction furnace may be undesirably lowered with resulting inefficiencies.

Carbonaceous fuel is introduced into the melter gasifier 10' and oxygen containing gas is blown into the melter gasifier 10' to combust the carbonaceous fuel to format least a first fluidized bed of coke particles from the carbonaceous fuel. Iron ore is reduced in the reduction furnace 120 to direct reduced iron. A portion of the direct reduced iron is introduced into the melter gasifier 10' through an entry port in the upper portion thereof. Coke, oxygen and direct reduced iron are reacted in the melter gasifier 10' to combust the major portion of the coke to produce reduction gas having a CO level of above 70% and molten iron containing heavy metals freed from combustion of the coke and a processed slag. Reduction gas at a temperature of about 1100° C. is flowed out of the melter gasifier via conduit 18' and combined with the preheated recycle gas from the reduction furnace via conduits 26', 32' and 36' to form a combined gas having a temperature of about 800° C. to 850° C. All of the combined gas is directed via conduit 37 to the reduction furnace 120 where it is reacted with iron ore to convert the iron ore to direct reduced iron and to carbonize the direct reduced iron with an increased carbon content prior to discharging the direct reduced iron to the melter gasifier 10' for further processing and bypassing a portion of the direct reduced iron for other purposes. The system of the present invention permits substantially doubling the iron output of the prior art melter gasifier and reduction furnace system at a reduced capital expenditure.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. A method of making molten iron utilizing a direct reduction furnace and a melter gasifier comprising providing a melter gasifier which is capable of forming a reduction gas during reaction of coke, oxygen and direct reduced iron; providing a direct reduction furnace which is capable of forming a top gas containing $CO_2$ during reduction of iron ore, said direct reduction furnace having sufficient capacity to utilize all of the reduction gas produced by the melter gasifier and the top gas produced by said direct reduction furnace after the $CO_2$ has been removed therefrom for the direct reduction of iron ore; introducing carbonaceous fuel into the melter gasifier; blowing oxygen containing gas into said melter gasifier and combusting said carbonaceous fuel to form at least a first fluidized bed of coke particles from said carbonaceous fuel; reducing iron ore in said reduction furnace to direct reduced iron; producing a top gas in said reduction furnace; flowing said top gas out of said reduction furnace and removing $CO_2$ from said top gas to form a recycle gas containing all of said top gas remaining after $CO_2$ removal; introducing at least a portion of said direct reduced iron into said melter gasifier through an entry port in the upper portion thereof; reacting coke, oxygen and direct reduced iron in said melter gas out of combust the major portion of said coke to produce reduction gas, molten iron and a processed slag; flowing reduction gas out of said melter gasifier; combining all of said reduction gas with all of said recycle gas from said reduction furnace to form a combined gas; directing all of the combined gas to said reduction furnace; reacting said combined reduction gas with iron ore in said reduction furnace to convert the iron ore to direct reduced iron; discharging a portion of the direct reduced iron directly to the melter gasifier for further processing and bypassing a portion of the direct reduced iron coming from said reduction furnace from the melter gasifier for other uses.

2. The method of claim 1 further characterized in that the carbonaceous fuel is petroleum coke.

3. The method of claim 1 further characterized in that the carbonaceous fuel is coal.

4. The method of claim 1 wherein the carbonaceous fuel is a mixture of petroleum coke and coal.

5. The method of claim 1 where the recycle gas is preheated prior to being combined with the reduction gas.

6. The method of claim 5 where the recycle gas is preheated to at least 500° C.

7. The method of claim 5 where the recycle gas is preheated to about 600° C.

8. The method of claim 5 where the portions of the direct reduced iron discharged to the melter gasifier and the portion of the direct reduced iron bypassed form the melter gasifier are about equal.

* * * * *